April 7, 1959 S. T. CARTER 2,880,845
SPOTTING MECHANISM FOR USE WITH ARTICLE BANDING MACHINES
Filed April 13, 1954 6 Sheets-Sheet 1

Inventor
Sidney T. Carter
by Roberts Cushman & Grave
Attys

April 7, 1959  S. T. CARTER  2,880,845
SPOTTING MECHANISM FOR USE WITH ARTICLE BANDING MACHINES
Filed April 13, 1954  6 Sheets-Sheet 2

Inventor
Sidney T. Carter
by Roberts Cushman Grover
Att'ys

April 7, 1959     S. T. CARTER     2,880,845
SPOTTING MECHANISM FOR USE WITH ARTICLE BANDING MACHINES
Filed April 13, 1954     6 Sheets-Sheet 3

Inventor
Sidney T. Carter
by Roberts Cushman Grover
Att'ys

April 7, 1959  S. T. CARTER  2,880,845
SPOTTING MECHANISM FOR USE WITH ARTICLE BANDING MACHINES
Filed April 13, 1954  6 Sheets—Sheet 6

Inventor
Sidney T. Carter
by Roberts Cushman & Grant
Att'ys

2,880,845

United States Patent Office
Patented Apr. 7, 1959

2,880,845

SPOTTING MECHANISM FOR USE WITH ARTICLE BANDING MACHINES

Sidney T. Carter, Shrewsbury, Mass., assignor to Geo. J. Meyer Manufacturing Co., Cudahy, Wis., a corporation of Wisconsin Application April 13, 1954, Serial No. 422,890

19 Claims. (Cl. 198—33)

This invention pertains to apparatus of the type known as "spotting mechanism" whose purpose is to orient an article, for instance a bottle to which a label or the like is to be applied, so as to insure the application of the label to a definite area of the peripheral surface of the bottle. Such spotting mechanism is customarily employed as an adjunct to a labeling machine and usually comprises means, including a friction clutch, for rotating the bottle through an arc of indeterminate extent until a projection, for instance a so-called "teardrop" on the peripheral surface of the bottle, contacts an abutment element and thereafter the clutch slips. In labeling machine practice it is customary to engage a so-called "head grip" with the top of the bottle neck, or a cap thereon, a hold the bottle in the final position of orientation resultant from its rotation and engagement with the abutment, until the label has been properly applied. However, if for any reason it is not practicable to employ a head grip, the above suggested spotter apparatus cannot be employed with any certainty that the bottle will be oriented to an exact predetermined position. For example, if a bottle having a label already applied thereto is to have a neckband applied which carries a printed design or other indicia which must be accurately related to a design or indicia on the label, it is manifestly impossible to engage a head grip with the bottle neck, since the neckband usually embraces the upper end of the neck or may even cover the cap. Moreover, the neckbanding operation is exceedingly rapid, so that the time available for orienting the bottle is very limited. Since, at times, the bottle may have to be turned through an arc of approximately 360°, a very high angular velocity of rotation must be available, while on the other hand the stopping of the bottle, when the projection or teardrop engages the abutment must be so controlled as to avoid breakage.

The present invention has for objects the provision of spotting apparatus capable of accurately spotting bottles or similar articles at very high speeds and without applying a head grip or similar device to the bottle neck or top. A further object is to provide a spotting means useful in presenting bottles to a neckbanding machine and capable of so orienting the bottle that a neckband, when applied thereto, will have a predetermined area of the band disposed in accurate relation to a particular area of the peripheral surface of the bottle. A further object is to provide spotting mechanism comprising means for rotating a bottle at a very high angular velocity but which permits the stopping of the bottle without recourse to the use of a friction clutch. A further object is to provide spotting means wherein the rotation and stopping of the bottle results from the employment of an electric drive clutch and an electric brake, thereby eliminating the very rapid wear and frequent replacement resultant from the use of friction clutches such as are customarily used in spotting devices. A further object is to provide spotting means so devised that the orientation of the bottle occurs in several stages whereby the final stopping of the bottle is caused to occur at the end of a relatively short arc of rotation, thus minimizing the inertia to be overcome in stopping. A further object is to provide means for positively holding a bottle in accurately spotted position while a neckband is being applied thereto. A further object is to provide for the automatic stopping of the apparatus in the event that a jam occurs at the star wheel, and also for starting the apparatus in response to the accumulation of articles at the entrance to the star wheel. Other and further objects and advantages of the invention will be pointed out in the following more detailed description and by reference to the accompanying drawings, wherein—

Fig. 1 is a fragmentary diagrammatic elevation, partly in diametrical section through the band-expanding sleeve of a transfer device, showing means for supporting a bottle while it dwells in position to receive a band from the transfer device, and indicating the relation of said supporting means and expander sleeve to a supply conveyor, to a delivery conveyor, and to spotting mechanism, according to the present invention;

Figure 1:
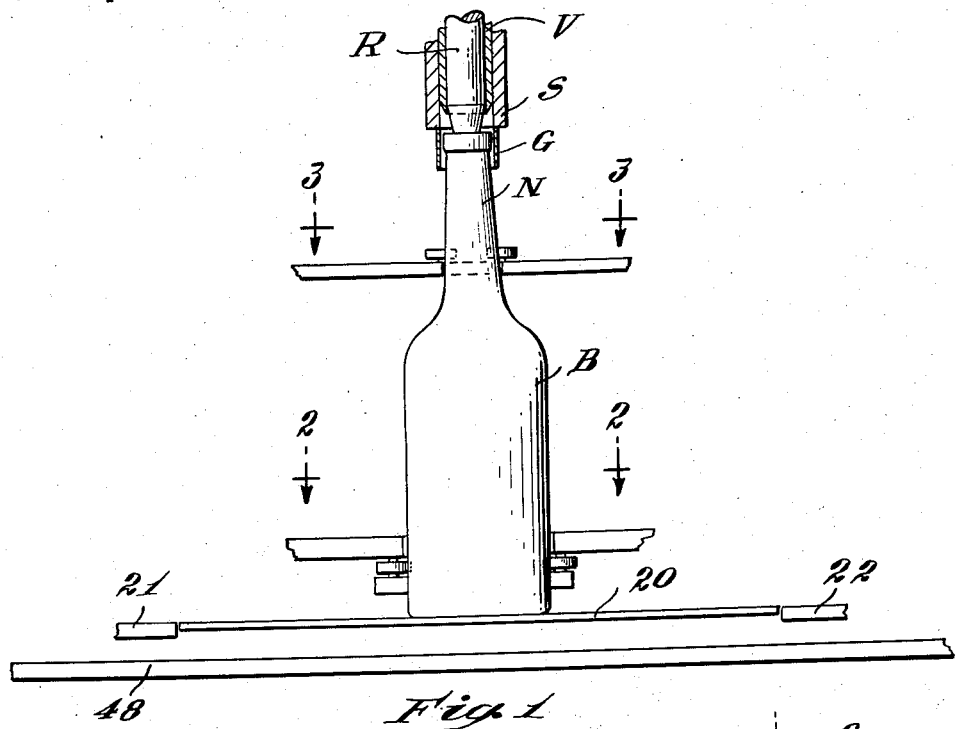
Fig. 1a is a diagrammatic elevation, with certain parts in section, illustrating the star wheel, forming the part of the spotting mechanism, by means of which the bottles are intermittently transferred from the supply conveyor to the delivery conveyor.
Fig. 1b is a fragmentary diagrammatic elevation, to larger scale, showing a bottle provided with a body label and a neckband, the band having thereon a design which is accurately located in symmetrical relation to a similar design on the body label.
Figure 1A:
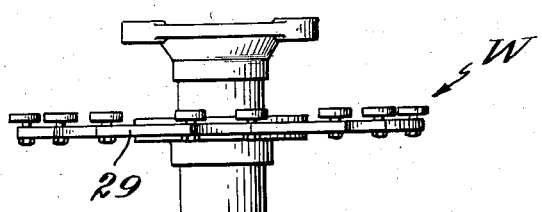
Figure 1A:
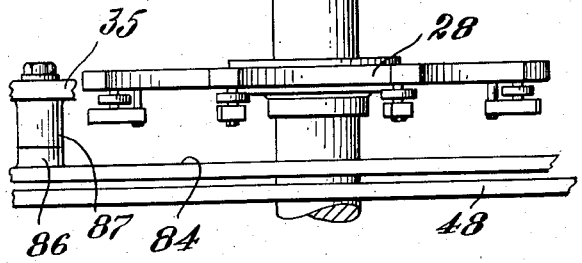
Figure 1B:
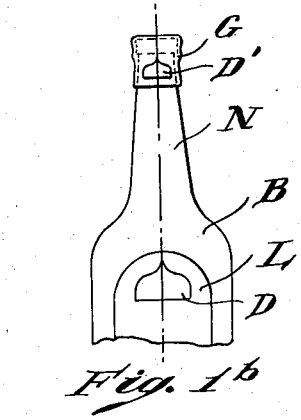

While it is to be understood that the spotting mechanism herein disclosed is of more general utility (although particularly adapted for use in a banding machine where the operation to be performed is extremely rapid), the invention is here illustrated with especial reference to its application to a neckbanding machine of the general type of that more fully illustrated and described in the co-pending application for United States Letters Patent Serial No. 248,078, filed September 24, 1951, by Henry W. Greer et al., entitled Device for Applying Bands to Containers. In a machine of the above type, as herein diagrammatically indicated in Fig. 1 of the drawings, a bottle B having a neck N is disposed in coaxial relation to and beneath the band-expanding sleeve V forming an element of the band transfer means of the band-applying mechanism. The band G (Fig. 1b) which is to be applied, is held in partially open position by a pair of opposed suction cups (not shown) while a rod R moves downwardly until its lower end engages the top or cap of the bottle neck. The band-expanding sleeve V now moves downwardly along the rod R and enters the band; the suction cups which have previously been holding the band are retracted and a stripper S engages the upper edge of the band G and slides the latter down from the sleeve V and onto the neck of the bottle.

Figure 9:
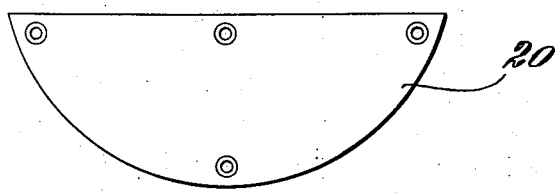
Fig. 9 is a plan view of the stationary plate upon which the bottle rests during the band-applying operation.

During the band-applying operation the bottle dwells in coaxial relation to the rod R as just above described—the bottle standing upon a stationary supporting plate 20 (Figs. 1, 4 and 9) while the band is being applied. The bottle is brought to the band-applying mechanism by a conveyor 21 (Figs. 1 and 12) and after receiving the band is carried away by a conveyor 22. These conveyors are constantly moving at uniform speed and the bottles are transferred from the supply conveyor 21 to the delivery conveyor 22 by means of an intermittently moving star wheel W (Fig. 12), and while thus being transferred from the supply conveyor 21 to the plate 20 (on which the bottle dwells while receiving the band) the bottles are oriented so as, for example, to insure that a design D' (Fig. 1b) carried by the band G will, when the band is applied, be in accurately registered or predetermined relation to a design D carried by a label L on the body of bottle B.

Figure 2:
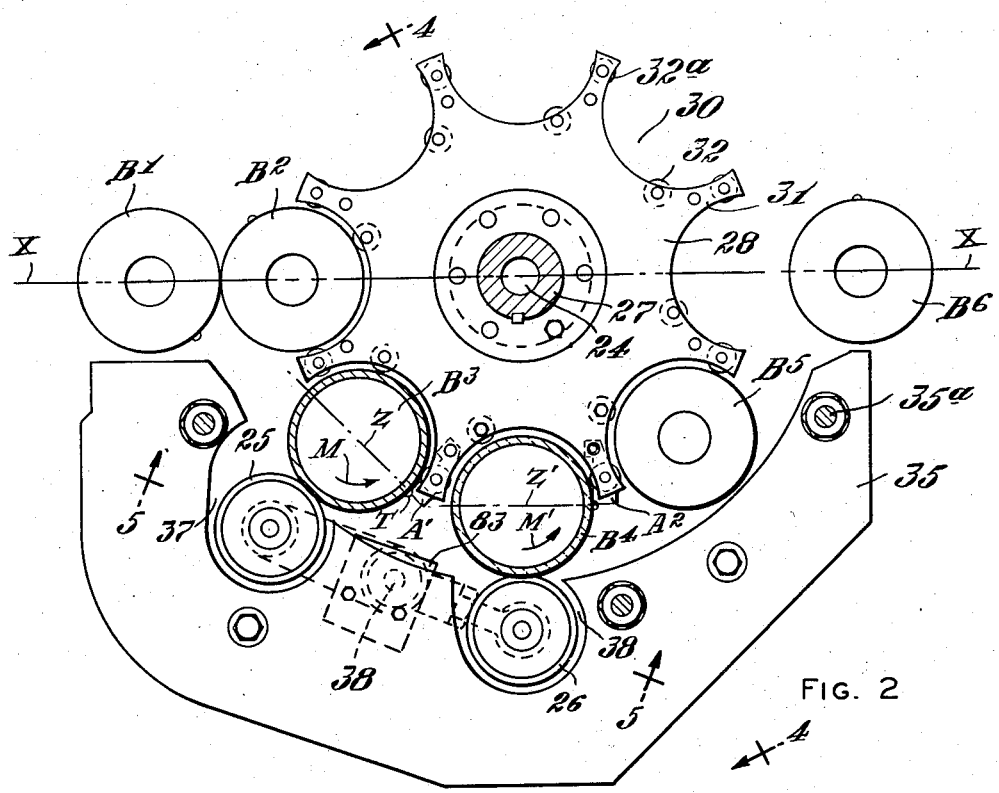
Fig. 2 is a fragmentary horizontal section, substantially on the line 2—2 of Fig. 1, but to larger scale, and omitting certain parts, showing the means for orienting the bottle during the spotting operation.

Referring to Fig. 2, the numeral 24 designates the axis of the star wheel W forming a part of the spotting mechanism. As illustrated in Fig. 2, the broken line X—X diagrammatically designates the center line of conveyor means 21 (Fig. 12) which brings the bottles to the spotting mechanism and conveyor means 22 (Fig. 12) which carries them away from the spotting mechanism. While these two conveyors are shown as aligned with each other, this is not necessary, since the discharge or delivery conveyor 22 may lead off from the center of the apparatus at an angle exceeding 180° away from the supply conveyor.

Figure 15:
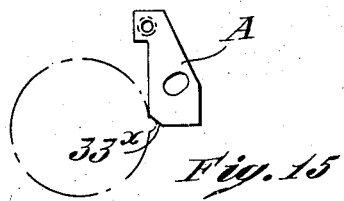
Fig. 15 is a plan view of one of the bottle-arresting abutments, to larger scale than Fig. 2.

As illustrated in Fig. 2, the successive positions of bottles passing through the spotting apparatus are indicated at B1, B2, B3, B4, B5 and B6 respectively, the bottle at the position B1 resting on the supply conveyor 21, while the bottle at the position indicated at B6 is on the delivery or discharge conveyor 22, and the bottle occupying the position B4 is that which is receiving a band from the band-applying mechanism. Each of the bottles is provided with a conventional projection or "teardrop" T which is accurately located with respect to that area of the bottle to which a label is to be applied, and the spotting mechanism comprises abutment members A (Fig. 15), one of which is contacted by the teardrop T on a given bottle during the spotting operation. These abutment members are so arranged that when the teardrop T engages the abutment at position A' (Fig. 2) that diameter Z of the bottle which extends through the teardrop will make an angle of approximately 45° with the center line X—X of the conveyor 21, and when the abutment occupies the position A2 (Fig. 2), the diameter Z' of the bottle which extends through the teardrop T will be substantially parallel to the center line X—X of the conveyor.

Figure 3:
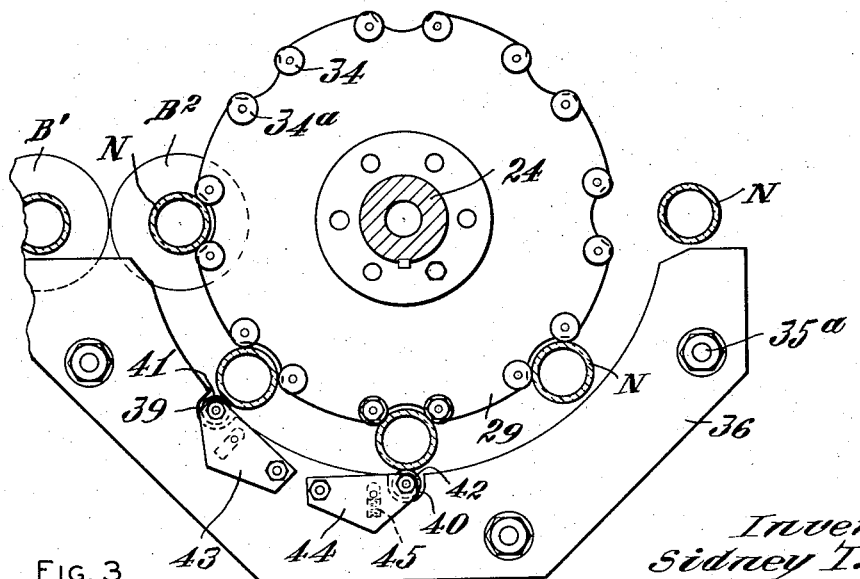
Fig. 3 is a section substantially on a line 3—3 of Fig. 1 but to larger scale, showing the means for steadying the neck portion of the bottle during the spotting operation.
Figure 4:
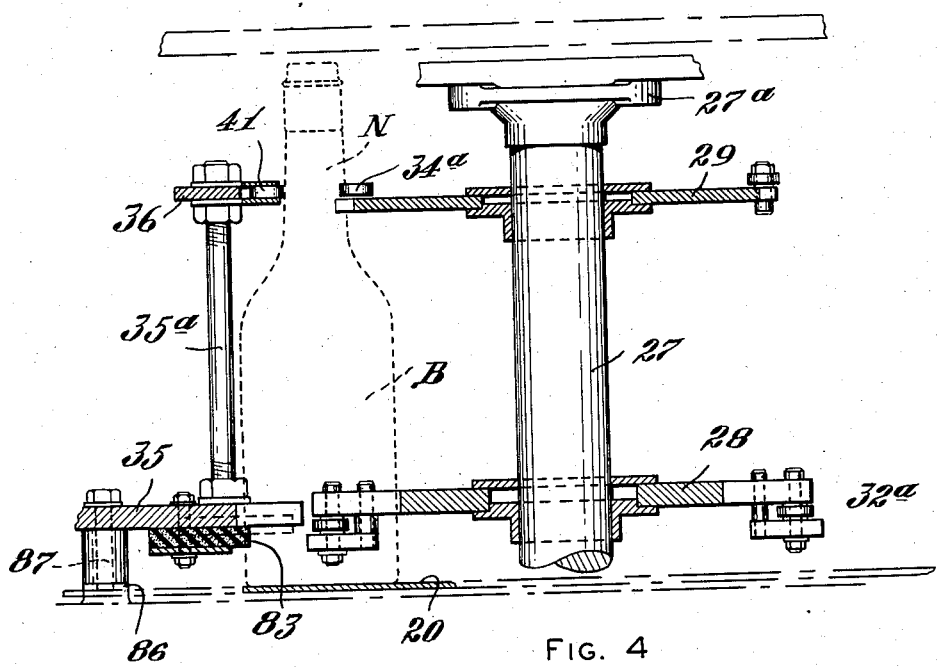
Fig. 4 is a diagrammatic elevation, partly in vertical section, substantially on the plane 4—4 of Fig. 2.

The spotting apparatus comprises two orienting or spinning rolls 25 and 26 which, by frictional engagement with the periphery of the bottle, turn the bottle in the direction of arrows M and M' (Fig. 2). The star wheel W comprises a vertical shaft 27 (Fig. 4), a bottom plate 28 (Fig. 2) and a top plate 29 (Fig. 3), these plates being secured, in vertically spaced relation, to the shaft 27 to turn with the latter. Suitable bearings (not shown) for the shaft are provided and the shaft is turned intermittently through an angle of 45° by means including a Geneva motion, one element of which is fixed to the shaft and indicated at 27a (Fig. 4). The bottom plate 28 as here shown (Fig. 2) is provided with eight uniformly spaced recesses 30 extending inwardly from its peripheral edge and separated by rigid arms 31. The recesses are of a radius such that each recess may receive the body portion of the bottle which is to be spotted and since the bottle must be rotated about its own axis while occupying one of the recesses 30, the plate 28 is preferably provided with antifriction rolls 32, 32a, etc., thereby to reduce the resistance to rotation of the bottle. The upper plate 29 is provided with equally spaced recesses 33 of smaller radius than the recesses 30 and which are designed to receive the neck portions of the bottles, the center of curvature of each recess 33 being in the same radial plane as the center of curvature of the corresponding recess 30. Antifriction rolls 34 and 34a are desirably associated with each of the recesses 33 so as to reduce the friction on the neck portion of the bottle as the latter turns. An abutment A (Figs. 4 and 15) is associated with each recess 30, each abutment being fixed to the underside of plate 28 and preferably having a surface 33x so disposed as to provide an extended contact for the teardrop T. Only two of these abutments are shown in Fig. 2.

Figure 5:
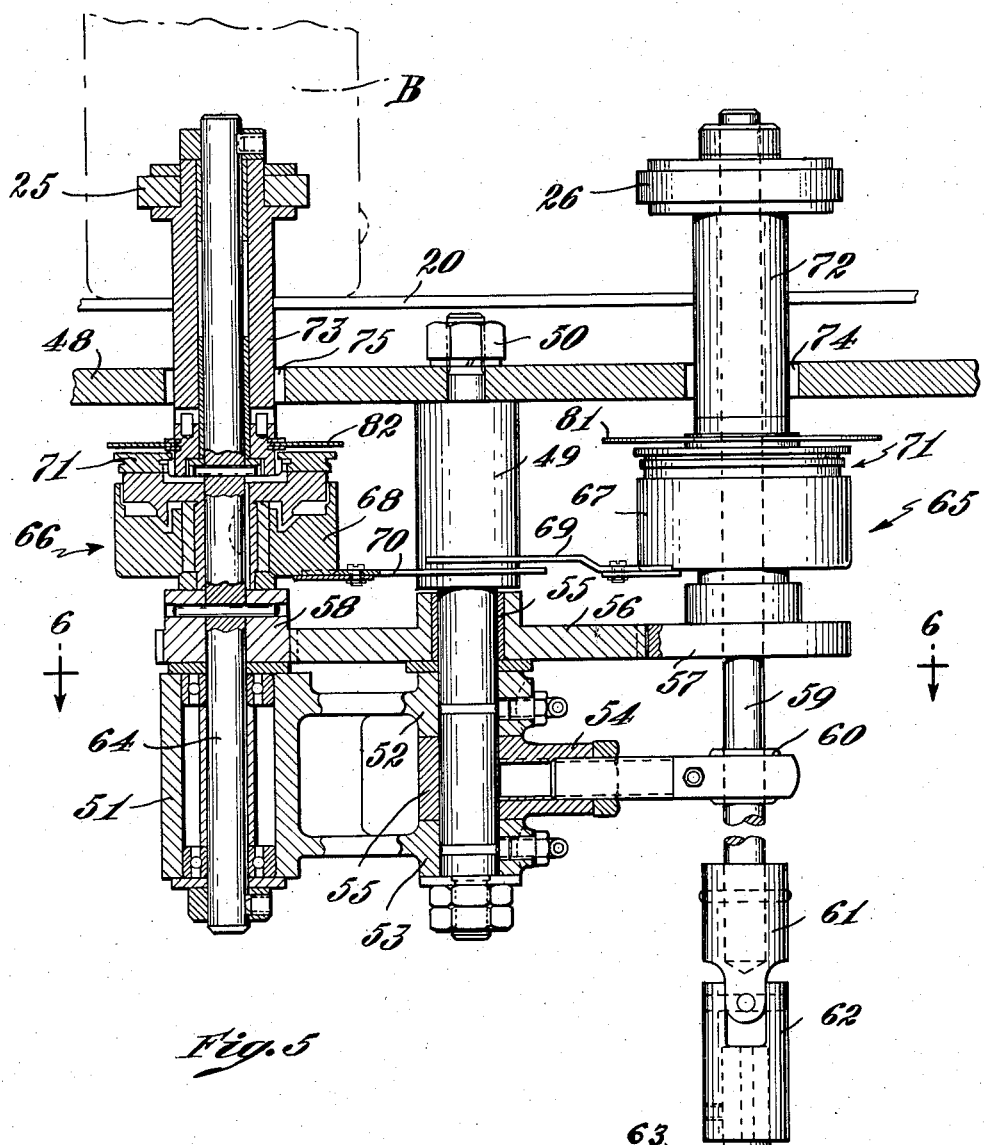
Fig. 5 is a fragmentary vertical section on the plane of the line 5—5 of Fig. 2 and showing the drive means for the bottle orienting spindles.
Figure 7:
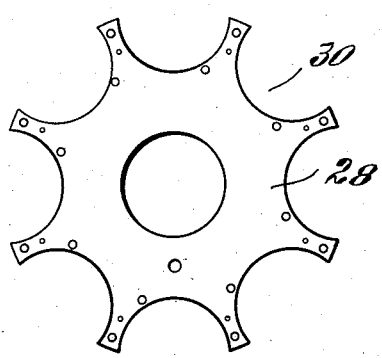
Fig. 7 is a plan view, to smaller scale, of the lower element of the star wheel, that is to say that part of the star wheel which engages the body of the bottle.
Figure 8:
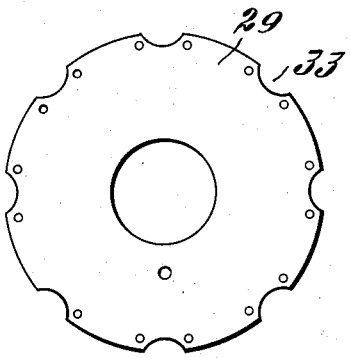
Fig. 8 is a plan view of the upper element of the star wheel which engages the neck portion of the bottle.
Figure 10:
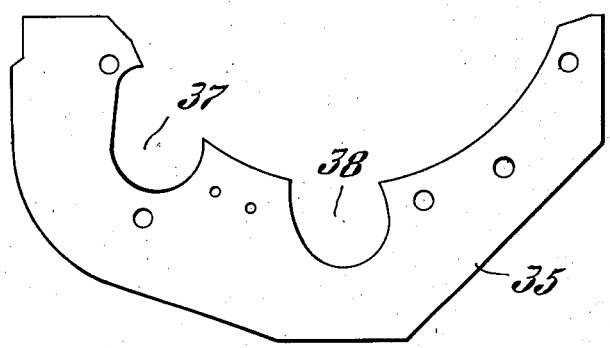
Fig. 10 is a plan view of the normally stationary guide which cooperates with the lower element of the star wheel to confine the bottle to a predetermined path.
Figure 11:
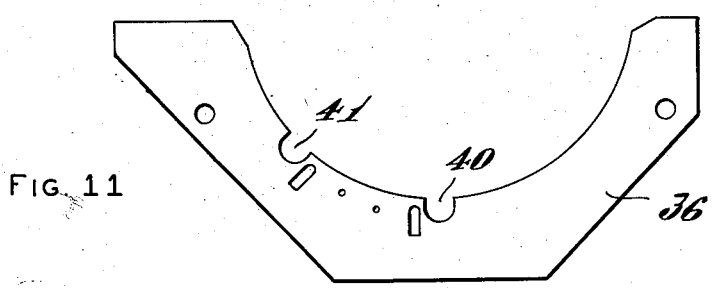
Fig. 11 is a plan view of the corresponding normally stationary guide member which cooperates with the upper member of the star wheel.

In order to confine the bottles to the recesses of the star wheel as they are moved along by the star wheel, normally stationary guide plates 35 and 36 (Fig. 4) are provided, these guide plates being disposed substantially in the horizontal planes of the star wheel members 28 and 29, respectively, and being held in properly spaced relation by means of posts or columns 35a preferably of adjustable length. The lower guide plate 35 (Fig. 10) is provided with recesses 37 and 38 for the accommodation of the bottle spinning rolls 25 and 26 (Fig. 2), while the upper plate 36 (Fig. 11) is provided with recesses 39 and 40 for the reception of antifriction rolls 41 and 42 (Fig. 3) mounted at the free ends of horizontally swinging levels 43 and 44 which are urged inwardly by means of springs 45 so as resiliently to press the rolls 41 and 42 against the necks N of the bottles so as to hold said necks in contact with the antifriction rolls 34 and 34a of the top plate 29 of the star wheel. The numeral 20 (Figs. 1, 4, 5 and 9) indicates a stationary plate whose upper surface is in the horizontal plane of the bottle-supporting surface of the conveyor, the plate 20 supporting the bottle while the latter is being moved by the star wheel from the supply conveyor to the delivery or discharge conveyor. As shown in Fig. 5, this stationary supporting plate 20 is located a short distance above the upper surface of the table 48 of the banding machine. A vertical stud 49 is arranged below the table 48 with its axis midway between the axes of the spinning rolls 25 and 26—the stud having a portion of reduced diameter at its upper end which passes up through a hole in the table 48 and which receives the clamping nut 50 whereby the stud is rigidly held in position. A swinging bracket 51 is mounted to turn on the lower portion of the stud 49, this bracket having vertically spaced journal portions 52 and 53 respectively which receive the stud. A second bracket 54, having a journal portion 55 interposed between the parts 52 and 53, also swings on the stud. Nuts at the lower end of the stud support the swinging brackets. Suitable means is provided for supplying lubricant to the stud so that these brackets 51 and 54 may swing freely.

A bushing 55a is arranged on the stud 49 above the upper journal member 52 and the hub portion of a spur gear 56 is mounted to turn on this bushing. This gear 56 meshes with spur gears 57 and 58, the latter being of smaller diameter than the gear 57. The gear 57 is fixed to a shaft 59 which turns in a swivel bearing 60 carried by the bracket 54. The lower end of the shaft 59 is secured to the upper element 61 of a universal joint whose lower element 62 is fixed to a shaft 63 which is driven by an electric motor (not shown). The gear 58 is fixed to a vertical shaft 64 which turns in an antifriction sleeve bearing carried by the swinging bracket 51 and since the gears 57 and 58 are of different diameters the shaft 64 will be turned at a higher angular velocity than the shaft 59. An electric clutch 65 (Fig. 5) is associated with the shaft 59 and a similar clutch 66 is associated with the shaft 64. These clutches are of a conventional type, such for example as may be purchased from Warner Electric Brake and Clutch Company, each clutch comprising a stationary member 67 and 68, respectively, which is prevented from rotating by means of fork arms 69 and 70, respectively, fixed to the parts 67 and 68, and which engage the fixed stud 49. Each clutch comprises an armature portion 71 which is mechanically free from the shaft corresponding thereto, but which turns with the shaft when the coils of the clutch are energized. The armatures of the clutches 65 and 66 are mechanically connected to sleeve members 72 and 73, respectively, which extend upwardly through elongate slots 74 and 75 in the table 48 and which are provided at their upper ends with means for holding the anti-friction rolls 26 and 25, respectively.

Figure 6:
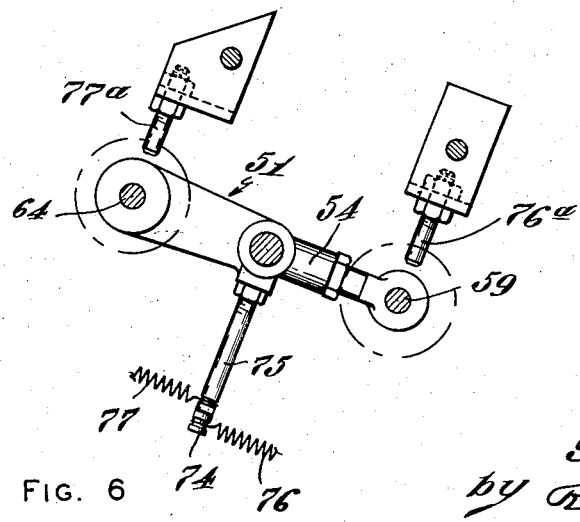
Fig. 6 is a fragmentary horizontal section substantially on the line 6—6 of Fig. 5.

As illustrated in Fig. 6, the swinging bracket arms 54 and 51 are provided, respectively, with radially projecting arms 74 and 75 to which tension springs 76 and 77 are connected, the springs and arms being so arranged that the springs tend to swing the bracket 51 in a clockwise direction and the bracket 54 in a counterclockwise direction, thus urging the friction rolls 25 and 26 in a nearly radial direction toward the axis 24 of the star wheel. Adjustable stops 76a and 77a limit swinging of the respective brackets. By reason of the swivel bearing 60 (Fig. 5) and the universal joint comprising the parts 61 and 62, it is possible for the shaft 59 to move bodily in and out toward the axis of the star wheel without binding or disrupting the connections. Desirably, annular plates 81 and 82 (Fig. 5) are fixed to the lower portions of the sleeves 73 and 72, respectively, just below the slots 74 and 75, in order that if any broken glass drop down through the slots, the glass may be thrown centrifugally away from the driving connections.

Referring to Figs. 2 and 4, the numeral 83 indicates a piece of soft resilient friction material, for example, felt, which is mounted in a clamp carried by the normally stationary guide plate 35 and which is so located as to be engaged by the periphery of the body portion of a bottle as the latter is moved from the spinning roll 25 toward the spinning roll 26.

Figure 13:
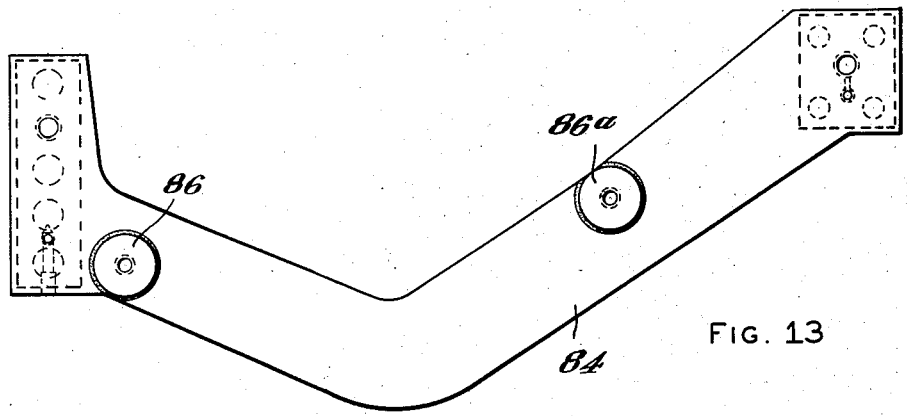
Fig. 13 is a plan view of a support for the normally stationary guide elements of the spotting mechanism, which is movable in response to a jam of bottles in passing the spotting mechanism so as to permit the guide members to move away from the star wheel.
Figure 13A:
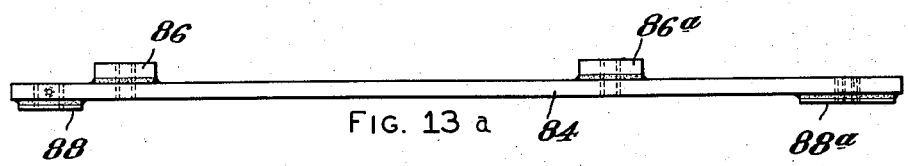
Fig. 13a is an edge elevation of the support shown in Fig. 13.

The upper and lower guide plates 36 and 35 are rigidly connected by posts 35a (Fig. 4) to form a unitary structure and this structure is mounted on a horizontally swinging arm 84 (Figs. 1a, 12 and 13a inclusive) which is pivotally supported at one end to swing about a vertical pin 85 projecting up from the machine table 48. The arm 84 has upwardly projecting bosses 86 and 86a (Fig. 13a) which form anchorages for the lower ends of posts 87 (Figs. 1a and 4) which rigidly unite the lower guide plate 35 to the arm 84. Desirably the arm 84 has downwardly directed bosses 88 and 88a (Fig. 13a) having finished lower surfaces which slide upon the upper surface of the table 48. A spring 89 (Fig. 12) tends to swing the arm 84 in a clockwise direction.

Figure 14:
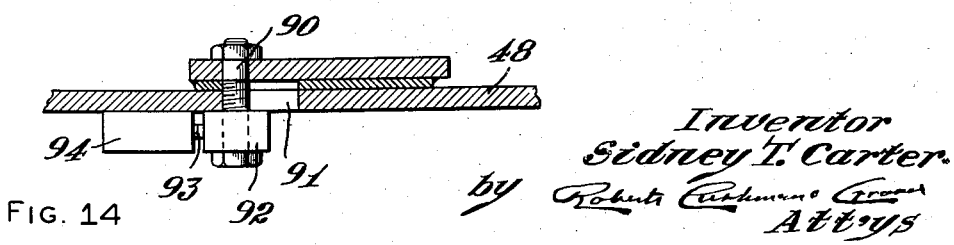
Fig. 14 is a fragmentary section, to larger scale, substantially on the line 14—14 of Fig. 12.

Near its free end the arm 84 carries a bolt 90 (Fig. 14) which extends down through a slot 91 in the table 48. To the lower end of this bolt is fixed a block 92 so located as normally to engage the actuating pin 93 (Fig. 14) of a snap-action electrical switch 94 fixed to the under surface of the table 48. However, if a jam occurs between the star wheel and the guide plates 35 and 36, the arm 84 will swing outwardly in opposition to the spring 89, thus removing the block 92 from the pin 93 and breaking the electrical circuit controlled by the switch 94.

Figure 12:
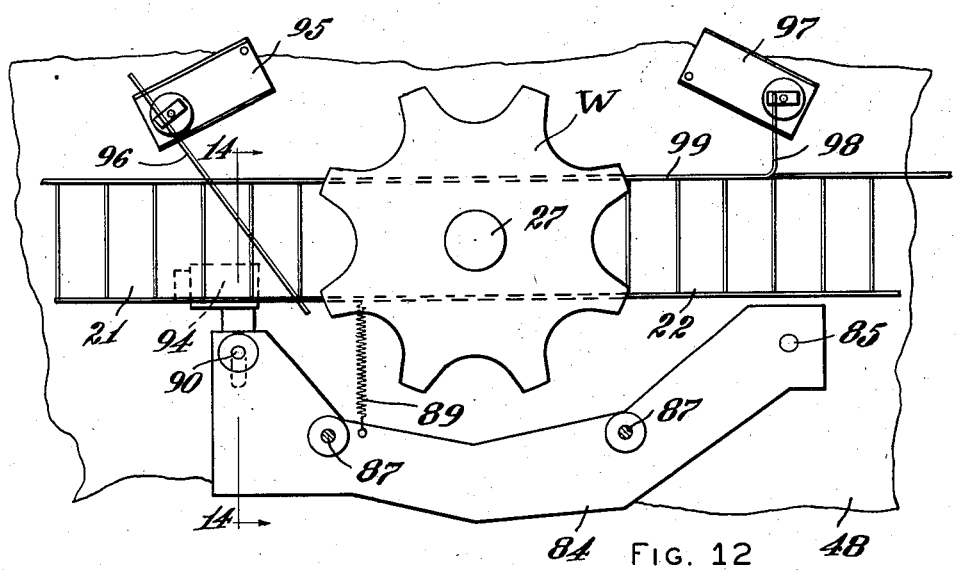
Fig. 12 is a diagrammatic plan view showing the relation of the star wheel to the supply and delivery conveyors and illustrating automatic means for starting and stopping the machine.

As illustrated in Fig. 12 another snap-action electrical switch 95 is suitably mounted at a point near the terminus of the supply conveyor 21, this switch being of the type which has a rotary actuating pin and to this pin is secured a long, desirably flexible arm 96 which extends diagonally across the conveyor 21 in position to be engaged by articles moving along the conveyor 21 and approaching the star wheel. The switch 95 is so connected into the circuit of the motor which operates the banding machine that when the arm 96 yields in response to pressure of a bottle against it, a circuit is closed which initiates the starting of the machine. Desirably the electrical circuit connections are such that when the starter switch 95, for initiating operation of the machine as a whole, is closed, the motor circuit is not actually completed until time has elapsed sufficient for several bottles to have arrived at the terminus of conveyor 21. For this purpose the motor circuit is designed to include an electronic timer of conventional type (not shown) which delays the actual closing of the motor circuit after the actuation of switch arms 96 until time has elapsed sufficient to insure the presence of a predetermined number of articles near the delivery end of the conveyor 21. If the incoming articles are not advancing in a continuous stream but are separated one from another by short distances, the motor (except for this delay action device) would stop and start for each article. Such performance would be unsatisfactory from a wear standpoint. Thus articles will accumulate on the conveyor 21 and the machine starts and stops for groups of articles rather than for each isolated article moving along the conveyor.

Since the electrical circuits, switches, and other appliances requisite to provide the above-described control of the drive motor are well within the knowledge of those skilled in the electrical field and are not per se comprised in the scope of the present invention, no further instruction concerning this feature is here needful.

As shown in Fig. 12, the machine also comprises a snap-action switch 97 suitably mounted on the machine table and having an actuating arm 98 of the rotary type and which has a portion 99 which lies substantially parallel to the delivery conveyor 22. The arrangement of this switch is such that if, through failure of the delivery conveyor 22 to remove articles from the star wheel as fast as they are expelled by the latter, the arm 99 will be swung by the lateral pressure of articles accumulating at the entrance of the delivery conveyor and will so actuate the switch 97 as to stop the machine motor.

Because of the complicated mechanically interlocked movements used in the banding machine, it is undesirable to stop the machine haphazardly at any point in the cycle. It is essential, for example, to have the star wheel stop exactly in proper registry with the conveyor 21 so as to be ready to accept the next incoming bottle from the conveyor 21 without jamming. For this reason cam-actuated limit switches (not here shown) are incorporated in the motor circuit in order to insure stopping of the machine at a predetermined point in the cycle.

As above noted, the principal purpose of the present apparatus is to insure the placing of a band on the bottle neck so that a design or the like carried by the band will, when applied to the bottle, occupy a definite position relatively to a label on the body of the bottle. When the star wheel W turns, it first brings a bottle, for instance, the bottle B3 (Fig. 2), into contact with the spinning roll 25, this roll turning at relatively high angular velocity as compared with the spinning roll 26. Contact of the roll 25 with the periphery of the bottle spins the latter until the teardrop T on the bottle encounters the fixed abutment at position A' which terminates rotation of the bottle about its own axis. The bottle as thus positioned is correctly arranged to receive the neckband, and the next forward movement of the star wheel brings the bottle to the position B4 (Fig. 2), which corresponds to the position of the bottle shown in Fig. 1, that is to say, the position in which its neck is axially aligned with the expander sleeve of the transfer device. However, as the bottle cannot be clamped by the customary head grip, since the top of the neck must be left free to receive the band G, the bottle might become displaced during this second step of advance. In accordance with the present invention the bottle is purposely turned reversely through a short arc in passing from the position B3 to the position B4—the periphery of the bottle encountering the stationary friction member 83 which turns the bottle in the reverse direction, for example, through an angle of 30°. When the bottle contacts the second spinning roll 26, it is turned again in the same direction as by the roll 25 until its teardrop T again encounters the fixed abutment at position A2. The amount of rotation resultant from contact with the spinning roll 26 is slight, so that the momentum of the bottle is relatively small and thus, when the teardrop T encounters the abutment at A2 there is little tendency for the bottle to rebound. Moreover, the spinning roll 26 remains in contact with the periphery of the bottle during the time that the bottle dwells at the banding station B4, so that, although the bottle is not confined by a head grip during its movement from position B3 to position B4, nevertheless during the actual banding operation the bottle is accurately positioned. Were the spinning roll 26 alone depended upon to orient the bottle, it would be necessary to drive the roll 26 at high velocity, since some bottles, in approaching the orienting means, may have their teardrops more than 300° away from the proper position. By the present arrangement, the first spinning roll 25, operating at high velocity, may turn the bottle through a large arc even approximating 360° and then, any displacement of the bottle during its movement to the banding position, is corrected by the second spinning roll 26 rotating at a lesser angular velocity. The friction element 83 is desirable, since it reversely rotates the bottle a slight amount before the bottle contacts the second spinning roll 26, thus avoiding the possibility that the bottle will accidentally turn, during its passage from position B3 to position B4, sufficiently to carry the teardrop T so far around in the direction of arrow M' that it would pass the abutment at position A' without contacting it.

As already noted, the spinning rolls are driven by means of electric clutches and by properly adjusting the excitation of these clutches, the spinning rolls 25 and 26 may be adjusted to slip at any desired value of torque. This avoids undue friction between the spinning rolls and the bottles after the teardrops have engaged the abutments. The degree of excitation of the clutches can readily be adjusted by means of potentiometers incorporated in the clutch circuits, a device well known to those skilled in the electrical arts.

While one desirable embodiment of the invention has herein been illustrated and described by way of example, it is to be understood that the invention is inclusive of any and all modifications within the scope of the claims.

I claim:

1. In combination in apparatus for presenting a bottle, having a spotting projection on the peripheral surface of its body portion, to means for applying a band to the bottle neck, a stationary support for the bottle, an intermittently turning star wheel for moving the bottle along the support from a first dwell position, at which the bottle is oriented, to a second dwell position at which the bottle is again oriented and at which the neck band is applied, friction means at each of said dwell positions operative, by engagement with the peripheral surface of the bottle body, to turn the bottle about its own axis, an abutment element mounted on the star wheel and which is engageable by the spotting projection, as the bottle turns, thereby to terminate rotation of the bottle, both of the bottle-turning means being operative to turn the bottle in the same direction, the means for turning the bottle while it dwells at the band-applying position being effective, while leaving the bottle neck exposed for the reception of the neck band, to hold the spotting projection firmly in contact with the abutment, and means operative to rotate the article in the reverse direction as it moves from one of said dwell points to another.

2. In combination in apparatus for orienting an article having a peripherally disposed spotting element, means for moving the article intermittently along a predetermined path and for causing the article to dwell at each of a plurality of points in said path, two friction rolls, one located at each of two successive dwell points, said rolls being engageable with the periphery of the article to turn the latter, means for rotating the rolls in the same direction but at different angular velocities, and means to stop rotation of the article while in contact with each respective roll and while said roll continues to rotate.

3. In combination in apparatus according to claim 2 a stationary friction element which is engaged by the periphery of the article as the latter moves from one dwell point to another, and which is operative to turn the article in a direction opposite to that imparted by the first of the friction rolls which contacts the article.

4. In combination in apparatus for turning a bottle having a spotting projection on its periphery about its vertical axis to position it for the reception of a neck band, means including an intermittently turning star wheel for moving the bottle along a fixed support in an arcuate path and for causing it to dwell at each of two spaced points along said path, one of said points being that at which the neck band is applied, constantly rotating friction rolls arranged to apply turning torque to the periphery of the bottle body while it is located at each of said two dwell points, respectively, and abutment means engageable by the spotting projection thereby to terminate rotation of the bottle at each of said dwell points, respectively, the second of said friction rolls being effective, while leaving the bottle neck exposed for the reception of the neck band, to hold its spotting projection in firm contact with the abutment during the application of the neck band, and wherein the abutment means comprises a part which is mounted on the star wheel to move with the latter.

5. In combination in apparatus for turning a bottle having a spotting projection on its periphery about its vertical axis to position it for the reception of a neck band, means including an intermittently turning star wheel for moving the bottle along a fixed support in an arcuate path and for causing it to dwell at each of two spaced points along said path, one of said points being that at which the neck band is applied, constantly rotating friction rolls arranged to apply turning torque to the periphery of the bottle body while it is located at each of said two dwell points, respectively, and abutment means engageable by the spotting projection thereby to terminate rotation of the bottle at each of said dwell points, respectively, the second of said friction rolls being effective, while leaving the bottle neck exposed for the reception of the neck band, to hold its spotting projection in firm contact with the abutment during the application of the neck band, and a normally stationary friction element arranged to engage the periphery of the bottle as the latter moves along said arcuate path from one dwell point to the next, thereby to turn the bottle in a direction opposite to that of the rotation of the star wheel.

6. In combination in apparatus for turning a bottle having a spotting projection on its periphery about its vertical axis to position it for the reception of a neck band, means including an intermittently turning star wheel for moving the bottle along a fixed support in an arcuate path and for causing it to dwell at each of two spaced points along said path, one of said points being that at which the neck band is applied, constantly rotating friction rolls arranged to apply turning torque to the periphery of the bottle body while it is located at each of said two dwell points, respectively, and abutment means engageable by the spotting projection thereby to terminate rotation of the bottle at each of said dwell points, respectively, the second of said friction rolls being effective, while leaving the bottle neck exposed for the reception of the neck band, to hold its spotting projection in firm contact with the abutment during the application of the neck band, and means for turning the two friction rolls in the same direction but at different angular velocities.

7. In combination in apparatus for turning a bottle, having a spotting projection on its periphery, about its vertical axis, said means including an intermittently turning star wheel for moving the bottle along an arcuate path and for causing it to dwell at a plurality of spaced points along said path, means for rotating the bottle while it dwells at one of said points, means for rotating the bottle at a lesser angular velocity but in the same direction while it dwells at the next successive point, and means operative to terminate rotation of the bottle while it dwells at each of said points respectively, and while the rotating means continues to function.

8. In apparatus for turning a bottle, having a peripheral spotting projection, about its vertical axis, means for moving the bottle along a predetermined path and for causing it to dwell at spaced points along said path, an abutment engageable by the spotting projection on the bottle thereby, while the bottle dwells at each of the dwell points and which is operative to terminate rotation of the bottle at each of said dwell points and means for turning the bottle at a relatively high angular velocity while it dwells at the first of said points and for turning it at a relatively lower velocity while it dwells at the second of said points.

9. In apparatus according to claim 8 wherein the bottle is turned in the same direction at each of said dwell points, and means for turning the bottle in the opposite direction as it moves from one dwell point to the next.

10. In combination with an intermittently rotating star wheel which moves articles, each having a spotting element, from a supply point to a neck-band receiving position, an abutment carried by and fixed relatively to the star wheel, means for turning the bottle while it dwells at the band-receiving point through an arc such as to contact its spotting element with the abutment, and means operative so to turn the bottle, while on its way from the supply to the band receiving point, that, while the bottle is dwelling at the band receiving point, a further turning of the bottle through an arc not greatly exceeding 30° is sufficient to engage its spotting element with the abutment.

11. The combination according to claim 10, wherein the means for turning the bottle on its way from the supply to the banding-point comprises means for turning the bottle through a maximum angle of 360° and means for reversely turning the bottle through an angle of the order of 30°.

12. Apparatus according to claim 10 wherein the means for turning the bottle on its way from the supply to the banding position comprises means for turning the bottle through an arc of a maximum of 360°, thereby to engage its spotting projection with the abutment before the article arrives at the band receiving point, and means operative to turn the bottle reversely through an arc of the order of 30° before it reaches the band applying position.

13. Apparatus according to claim 10 wherein a spinning roll is arranged adjacent to each of said dwell points and which is operative, by contact with the periphery of the bottle, to turn the latter until its spotting projection engages the abutment, and the means for turning the bottle reversely on its way from one dwell point to the next comprises a stationary friction element engageable with the peripheral surface of the bottle as the latter is moved by the star wheel from one dwell point to the next.

14. Apparatus according to claim 10 having a constantly rotating spinning roll engageable frictionally with the periphery of the bottle, while the latter dwells at the second of said points, for turning the bottle thereby to engage its projection with the abutment on the star wheel, said spinning roll being constructed and arranged to remain in contact with the periphery of the bottle, while continuing to rotate, so long as the bottle dwells at said second point, thereby to keep the spotting projection in contact with the abutment until the star wheel resumes its forward motion.

15. In combination with an intermittently rotating star wheel which moves articles, each having a projection, from a first dwell point to a second dwell point, an abutment carried by the star wheel and which is operative, while the star wheel dwells at one of said points, by contact with the projection on the article to hold said projection in definite predetermined relation to a radial plane of the star wheel, spinning means located adjacent to a preceding dwell point operative to spin an article, dwelling at said latter point, to bring its projection into contact with said abutment, means to reverse the rotation of the article through an arc of approximately 30° while the article moves from the first to the second of said dwell points, and spinning means operative to re-engage the projection with the abutment while the article dwells at the second of said points.

16. In combination with an intermittently rotating star wheel which moves bottles, resting on a stationary support, each bottle having a spotting projection on the periphery of its body portion, from a supply to and beyond a band-receiving position and which causes the bottle to dwell at a plurality of successive points, one of which is a band-receiving station, an abutment carried by the star wheel which is operative, when the bottle dwells at the band-receiving position, by contact with the spotting projection to locate said projection in definite relation to a predetermined radial plane of the star wheel, friction means adjacent to the band-receiving position for applying torque to turn the bottle at relatively low angular velocity in a predetermined direction and through an arc sufficient to contact its spotting projection with said abutment, and to maintain it in contact with the abutment during the band-applying operation, and friction means operative to turn the bottle at relatively high angular velocity before it arrives at the band-receiving position through an arc such that a maximum rotation not substantially exceeding 30° at the band-receiving position is sufficient to contact its spotting projection with the abutment, further characterized in having means operative, at a dwell point preceding the band-receiving position, for turning the bottle until its spotting projection engages said abutment, and means operative, while the star wheel is in motion, for reversely turning the bottle to carry its projection approximately 30° away from the abutment.

17. In combination with conveyor means for moving a bottle, provided with a spotting projection on its body portion, from a supply to a dwell point and then to a second dwell point where a band is applied to the bottle neck, an abutment carried by said bottle-moving means which is operative, when the bottle dwells at the second of said dwell points, by contact with the spotting projection on the bottle to hold the latter in a definite predetermined position of orientation while leaving its neck exposed for the reception of the neck band, a spinning roll adjacent to each of said dwell points and which is operative by contact with the periphery of the bottle, while the latter dwells at each respective point, to rotate the bottle through an arc sufficient to bring its spotting projection into contact with said abutment, means supporting each of said spinning rolls to move bodily toward and from the conveyor, spring means urging each spinning roll toward the conveyor, thereby to engage it with a bottle in the corresponding dwell position, and means operative uninterruptedly to turn the two spinning rolls in the same direction, and means operative to turn the bottle reversely as it moves from one dwell point to the next, and means for turning the spinning roll which is associated with the dwell point at which the band is applied at a substantially less angular velocity than the preceding spinning roll.

18. In apparatus for spotting bottles at high speed, means for turning a bottle in a given direction through a maximum arc of 360° to a predetermined position of orientation, means for reversely turning the bottle from said position through an angle not substantially exceeding 30°, and means for again turning the bottle in the first direction to a final accurate position of orientation.

19. In apparatus for spotting bottles at high speed, each bottle having a spotting projection, an abutment, means for first turning a bottle through an angle not exceeding 360° to bring its spotting projection into engagement with the abutment, means for thereafter rotating the bottle reversely to separate the spotting projection from the abutment by an arc not substantially exceeding 30°, and means for again turning the bottle in the first direction until its spotting projection again engages said abutment.

References Cited in the file of this patent
UNITED STATES PATENTS

| | | |
|---|---|---|
| 1,358,255 | Seufer | Nov. 9, 1920 |
| 2,106,997 | Fenner | Feb. 1, 1938 |
| 2,109,505 | Rue | Mar. 1, 1938 |
| 2,528,912 | Rappaport | Nov. 7, 1950 |
| 2,547,076 | Bois | Apr. 3, 1951 |
| 2,577,341 | Magnusson | Dec. 4, 1951 |
| 2,708,502 | Carter | May 17, 1955 |